US006580498B1

(12) United States Patent
Harley

(10) Patent No.: US 6,580,498 B1
(45) Date of Patent: Jun. 17, 2003

(54) OPTICAL RETURN LOSS DETECTOR FOR OPTICAL TRANSMISSION SYSTEMS

(75) Inventor: James Harley, Ottawa (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/773,707

(22) Filed: Feb. 2, 2001

(51) Int. Cl.[7] .......................... G01N 21/00; H04B 10/12
(52) U.S. Cl. ....................................... 356/73.1; 359/124
(58) Field of Search .................. 356/73.1; 359/110, 359/169–710, 143, 187, 177, 162, 124; 385/16–18, 60–61, 33, 38, 50, 56

(56) References Cited

U.S. PATENT DOCUMENTS 6,111,676 A * 8/2000 Lemus et al. ................ 359/124

* cited by examiner

Primary Examiner—Tu T. Nguyen
(74) Attorney, Agent, or Firm—Robert A. Wilkes; Harold C. Baker; Robert G. Hendry

(57) ABSTRACT

The present invention provides an apparatus and method of detecting, on a per wavelength basis, optical return loss at the output of an optical circuit pack. The optical circuit pack can be, for example, an optical amplifier. At an output port and reflected port of the optical circuit pack apparatus for detecting signals is connected. The output power and reflected power are measured, and the optical return loss is calculated. The return loss may be calculated for signals on one or more wavelength channels.

5 Claims, 4 Drawing Sheets

OPTICAL RETURN LOSS DETECTOR FOR OPTICAL TRANSMISSION SYSTEMS

FIELD OF INVENTION

This invention relates to a method and means for measuring the optical return loss in an optical transmission system.

BACKGROUND TO THE INVENTION

Phenomenal growth of industry sectors such as the Internet and high-speed data, service providers are searching for ways to increase their fiber optic network capacity sooner than expected. Service providers are searching for new and creative ways to generate revenues while fully meeting the varying needs of their customers. Dense Wavelength Division Multiplexing (DWDM) partitions and maintains different dedicated wavelengths for different customers, for example, service providers can lease individual wavelengths as opposed to an entire fiber. Using optical multiplexers and optical amplifiers, DWDM combines multiple optical signals so that they can be amplified as a group and transported as wavelength channels over a single optical fiber to increase network capacity.

In the field of high capacity optical transmissions systems there is a need to provide a means for detecting the optical return loss. Optical return loss is defined as the proportion of reflected-optical signal measured at a given wavelength at the output of an amplifier circuit pack. Optical transmission systems propagate signals along multiple wavelength channels on a single medium. The signals, each having a different wavelength, may travel through different optical paths and equipment. Based on the optical path, the number of reflections per signal may differ. Isolating the return loss (RL) for a particular wavelength increases diagnostic capabilities of the optical transmission system. The diagnosis can report excessive return loss in the transmission of a signal at an individual wavelength.

Optical return loss may be detected at an increased level at the output of an optical amplifier, such as an erbium doped fiber amplifier (EDFA). The optical amplifier is charged with amplifying an optical signal. Amplifying a signal increases the data rate of the signal to a much higher rate along the optical communication path. As signals are amplified, reflections of a certain portion of light occur along a fiber optic path. These reflections are measured and used to determine the optical return loss.

Techniques to measure optical return loss (RL) have been disclosed. In U.S. Pat. No. 5,822,094, (O'Sullivan et al.), issued Oct. 13, 1998, and assigned to Nortel Networks, RL is measured over an average of wavelengths. This technique does not measure optical return loss on a per wavelength basis.

U.S. Pat. No. 6,111,676, (Avid Lemus et al.), issued Aug. 29, 2000 and assigned to Nortel Networks, discloses a means to measure optical return loss on a per wavelength basis. Although the invention does detect return loss, the detection means is limited. Lemus et al. describes a wavelength specific optical reflection meter/locator in signatured wavelength division multiplexed systems. This optical reflection meter/locator requires a unique intensity dither on each wavelength that is known to the optical amplifier. In the case of unknown wavelength sources, information regarding the intensity dither is not known or difficult to acquire. In addition, for high wavelength count and multiple span optical systems, cross-coupling of dithers from one wavelength to another will occur due to Stimulated Rayleigh Scattering which compromises the accuracy of the calculations of network loss.

SUMMARY OF THE INVENTION

The objective of any communication system is to offer continuous transmission service and, preferably, to detect and isolate faults. The process of detecting faults must be accomplished with minimum disruption or attenuation of the signal. With limited knowledge of the signal, the invention can detect the optical return loss. The present invention creates an accurate and efficient diagnosis of transmission inadequacies. In high capacity optical networks, companies must maintain certain transmission levels which include bounded optical return losses. If return losses are too low, then the signals can be degraded by multi-path interference. Low optical return losses at the output of optical amplifiers are particularly dangerous for multi-path effects, where light is reflected back into the amplifier, experiences gain, and is then reflected back out in the original direction. The delayed version of the optical signal can interfere with itself which causes optical performance degradation. If return losses are high, the signals being transmitted are degraded. This reduces the revenue generated by the transmission system services. As optical transmission systems service larger geographical distances in the network, manual diagnostics has become virtually impossible. The present invention eliminates the latter inefficiency.

The present invention provides an apparatus and method of detecting, on a per wavelength basis, optical return loss at the output of an optical circuit pack. The optical circuit pack can be, for example, an optical amplifier. At an output port and reflected port of the optical circuit pack a means for detecting signals is connected. The output power and reflected power are measured, and by the same means, the optical return loss is calculated. A return loss may be calculated for signals on one or more wavelength channels.

In one aspect the invention provides an apparatus for detecting optical return loss at the output port of an optical circuit pack in an optical transmission system, which comprises:

detecting means for detecting an outgoing optical signal of the optical circuit pack;

measuring means for measuring output wavelength power of an outgoing optical signal;

measuring means for measuring reflected wavelength power of a reflected optical signal for detecting optical return loss;

processing means for processing said detected outgoing optical signal for determining ratio of the reflected wavelength power to the output wavelength power, the ratio indicating the optical return loss;

wherein the detecting means outputs a detected signal to the measuring means, the measuring means outputs measured output wavelength power and reflected wavelength power to said processing means, the processing means determines the optical return loss calculated from measuring output wavelength power and reflected wavelength power.

In another aspect the invention provides a method for detecting return loss for a signal on a per wavelength basis at an output of an optical circuit pack, comprising the steps of detecting an optical signal at the output of the optical circuit pack;

measuring power for an output signal and a reflected signal at an output port and reflected port respectively and an optical tap connected to a fused splitter at the output of the optical circuit pack; and calculating return loss per wavelength, as a ratio of the reflected power per wavelength to the output power per wavelength.

Because of the recent drop in price of Optical Spectrum Analysers (OSA),their use is increasingly cost effective and practical in DWDM Systems. This has been due to the development of photo-detector array based OSA, as well as tuned Fabry-Perot filters. Cheaper OSAs make the above invention more amenable to implementation.

BRIEF DESCRIPTION OF THE DRAWINGS

A better understanding of the invention will be obtained by a consideration of the detailed description below, in conjunction with the following drawings, in which.

DETAILED DESCRIPTION

Figure 1:
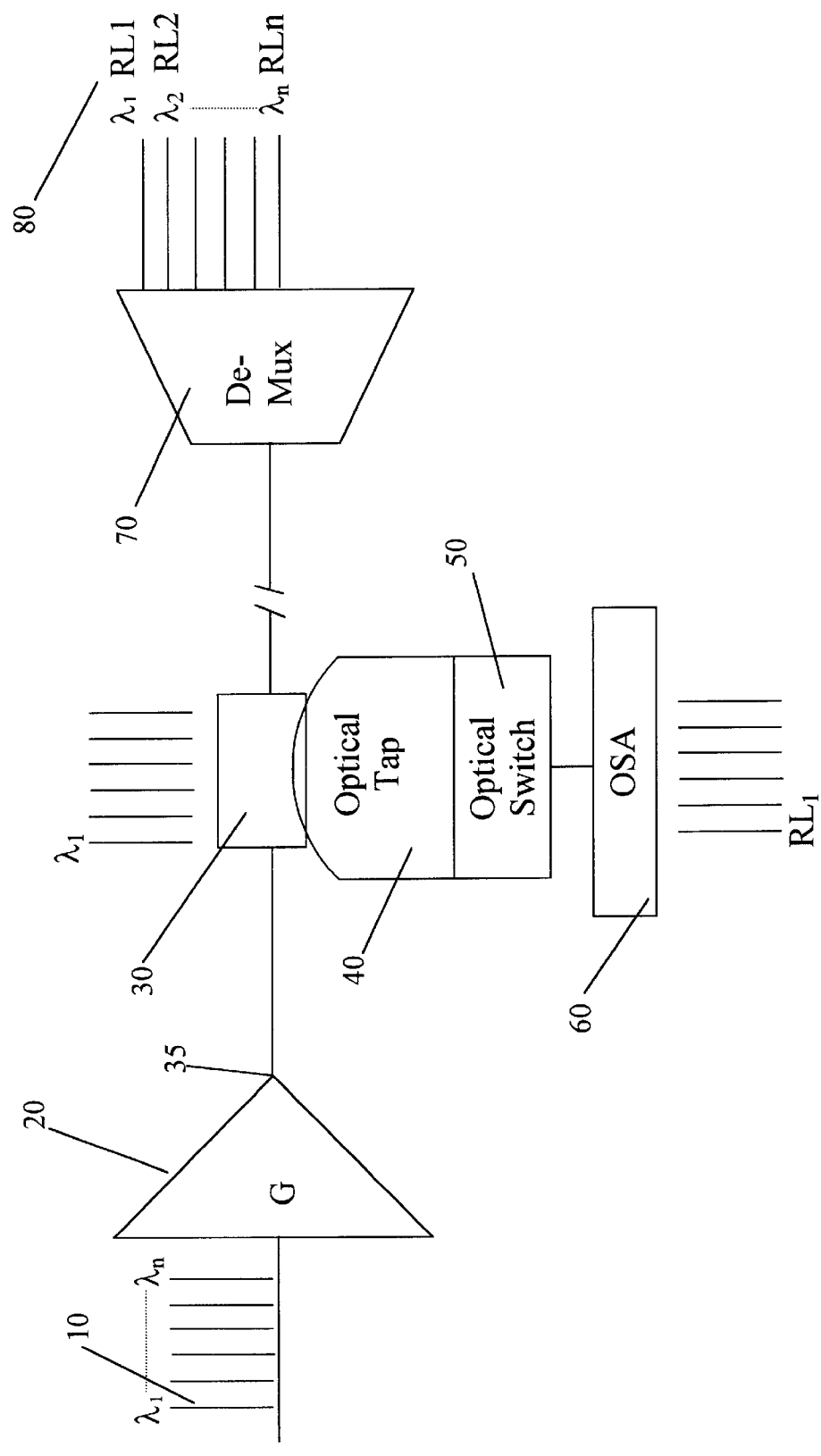
FIG. 1 is a block diagram of a wavelength optical return loss detector at the output of an amplifier module.

Referring to FIG. 1, the optical gain amplifier 20 receives multiple signals, each signal having a different wavelength 10, λ1 to λn. The optical signal is then monitored by use of the fused coupler 30 and optical tap 40. The fused coupler 30 and optical tap 40 may be embedded in the optical gain amplifier 20. The tap 40 absorbs approximately 5 percent of the light from the optical waves. An optical switch 50 is attached to the optical tap 40. This optical switch 50 selects the optical wavelengths being tapped. The optical spectrum analyser (OSA) 60 measures the output and reflected power of the optical signal and calculates return loss on a per wavelength basis.

Once the output power and reflected power per wavelength are measured, it is a simple calculation to determine the return loss (RL): RL=Reflected Power per wavelength/ Output power per wavelength The return loss is determined for each wavelength, λ1 to λn. An increase in an RL value may cause signal degradation along the wavelength channel. The OSA 60 then outputs the RL value to requesting terminals. The above technique isolates any problems that occur as signals travel through different paths and equipment. Depending on the RL detected in the signal, adjustments can be made to improve the RL of the signal prior to being output by the demultiplexer 70. The demultipiexer 70 outputs the signal along multi-channel path 80, on wavelengths λ1 to λn. RL1 to RLn refers to the return loss corresponding to λ1 to λn respectively. Preferably the optical spectrum analyzer 60 is a photodetector array.

Figure 2:
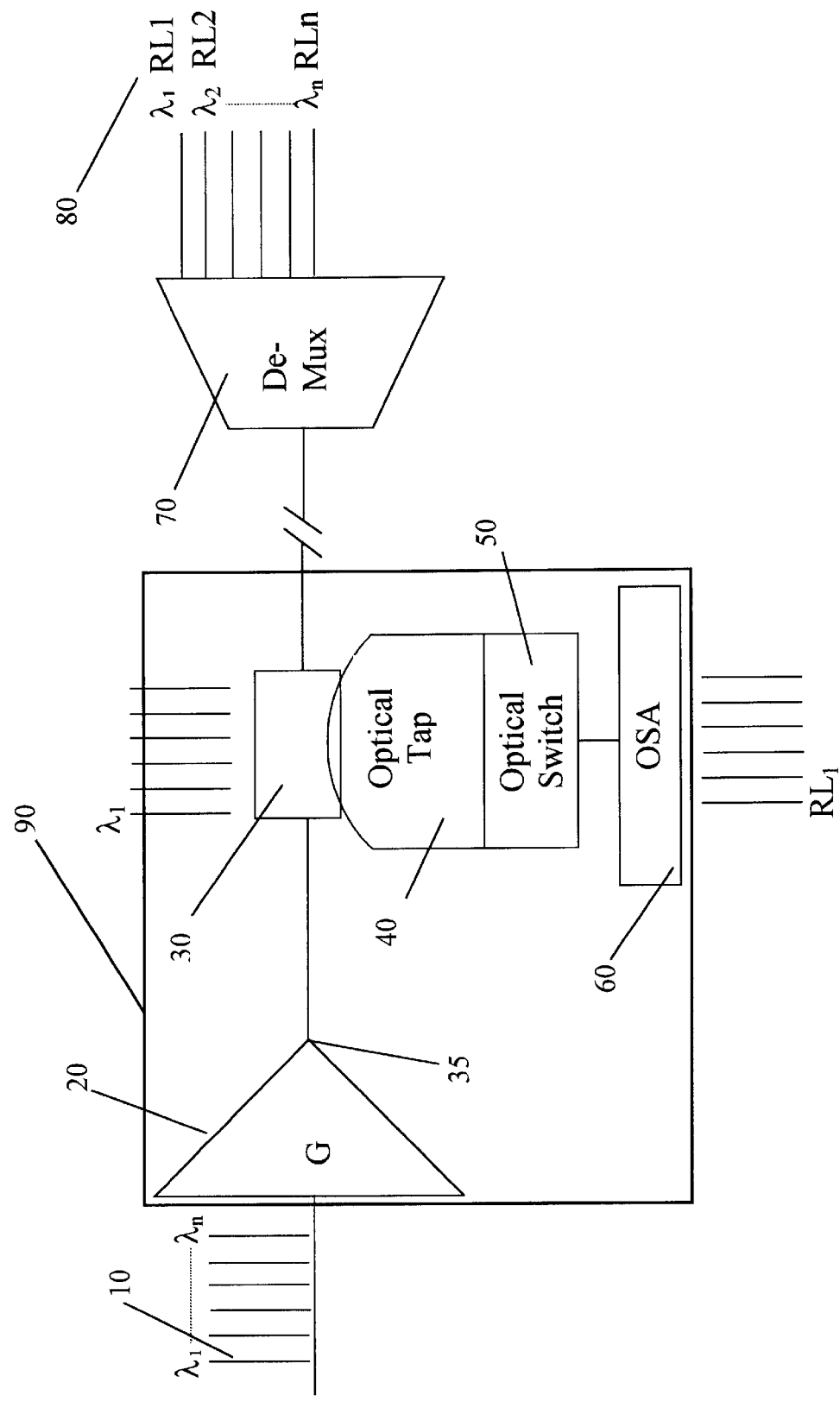
FIG. 2 is an illustration of another wavelength optical return loss detector embedded in an amplifier module.

FIG. 2 is another embodiment of the present invention. The fused coupler 30, the optical tap 40, the optical switch 50, and optical spectrum analyser 60 are embedded with the amplifier 20 in a circuit pack 90. As previously illustrated in FIG. 1, the fused coupler 30 and optical tap 40 are attached to the output port and reflected port of the circuit pack 90. The optical spectrum analyser 60 then monitors the return loss of the signal. Consequently, the spectrum analyser 60 measures the output power and reflected power. The optical spectrum analyser 60, as it is internal to the amplifier circuit module, can be used for quick and efficient self-diagnosis tests on a continuous basis. The optical spectrum analyser 60, tap 40, switch 50 and fused coupler 30 are internal to the amplifier module. This amplifier module can then be replicated throughout the optical transmission system. Furthermore, the optical spectrum analyser may be replaced by any wavelength power monitoring device.

Figure 3:
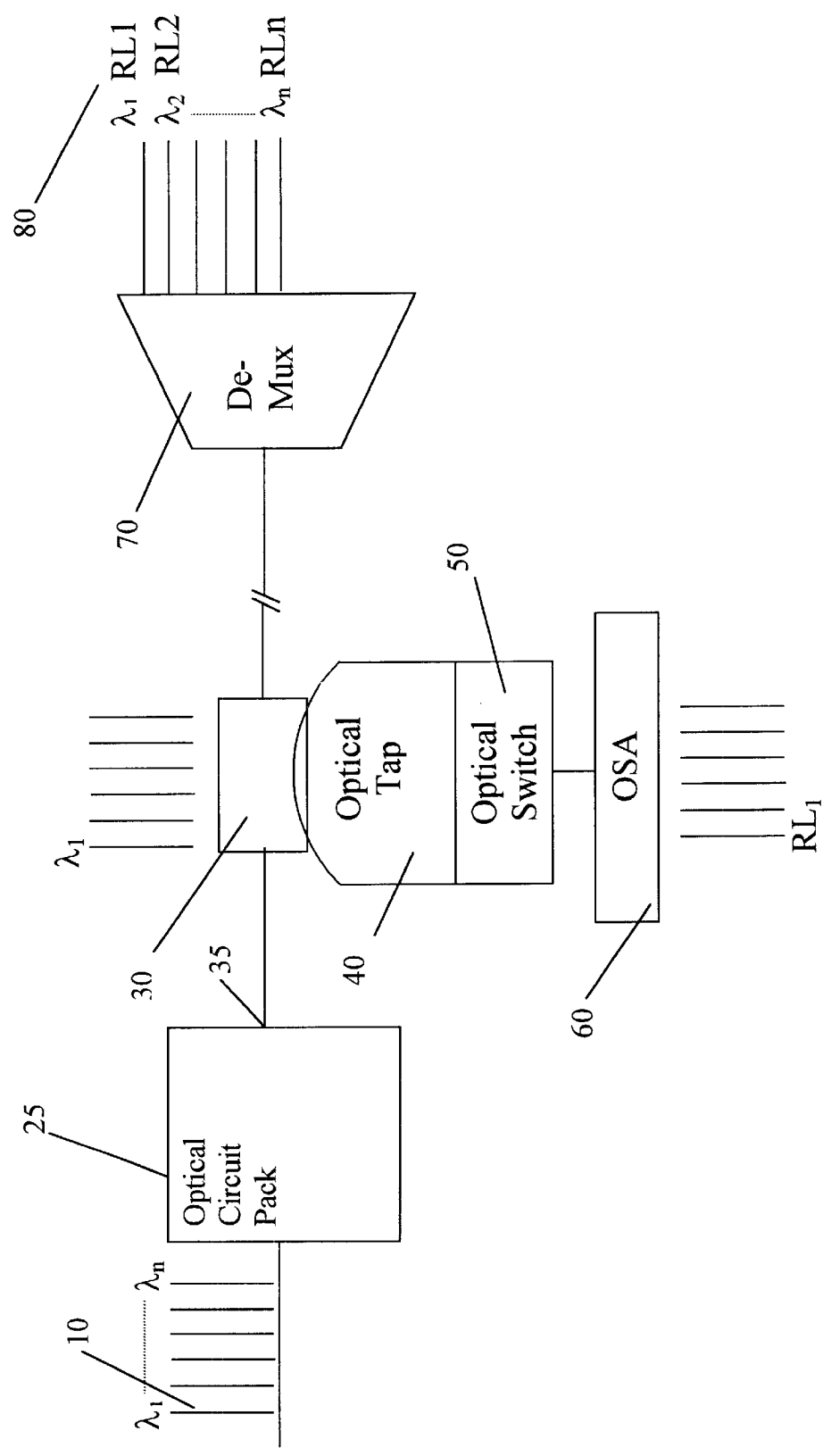
FIG. 3 is an illustration of another embodiment of a wavelength optical return loss detector at the output of an optical circuit pack.

Referring to FIG. 3, the per-wavelength optical return loss detector is placed at the output port of an optical circuit pack to monitor other modules in the optical transmission system. The optical tap 40 and fused coupler 30 need only be placed at the output port and reflected port 35 to detect the output and reflected power levels. This illustration shows an external attachment of the optical tap 40 and fused coupler 30 to the optical circuit pack 25, but as in FIG. 2, it may be embedded in the circuit pack module as one unit.

According to the techniques of the present invention, the optical signal is minimally affected by the detection process.

Figure 4:
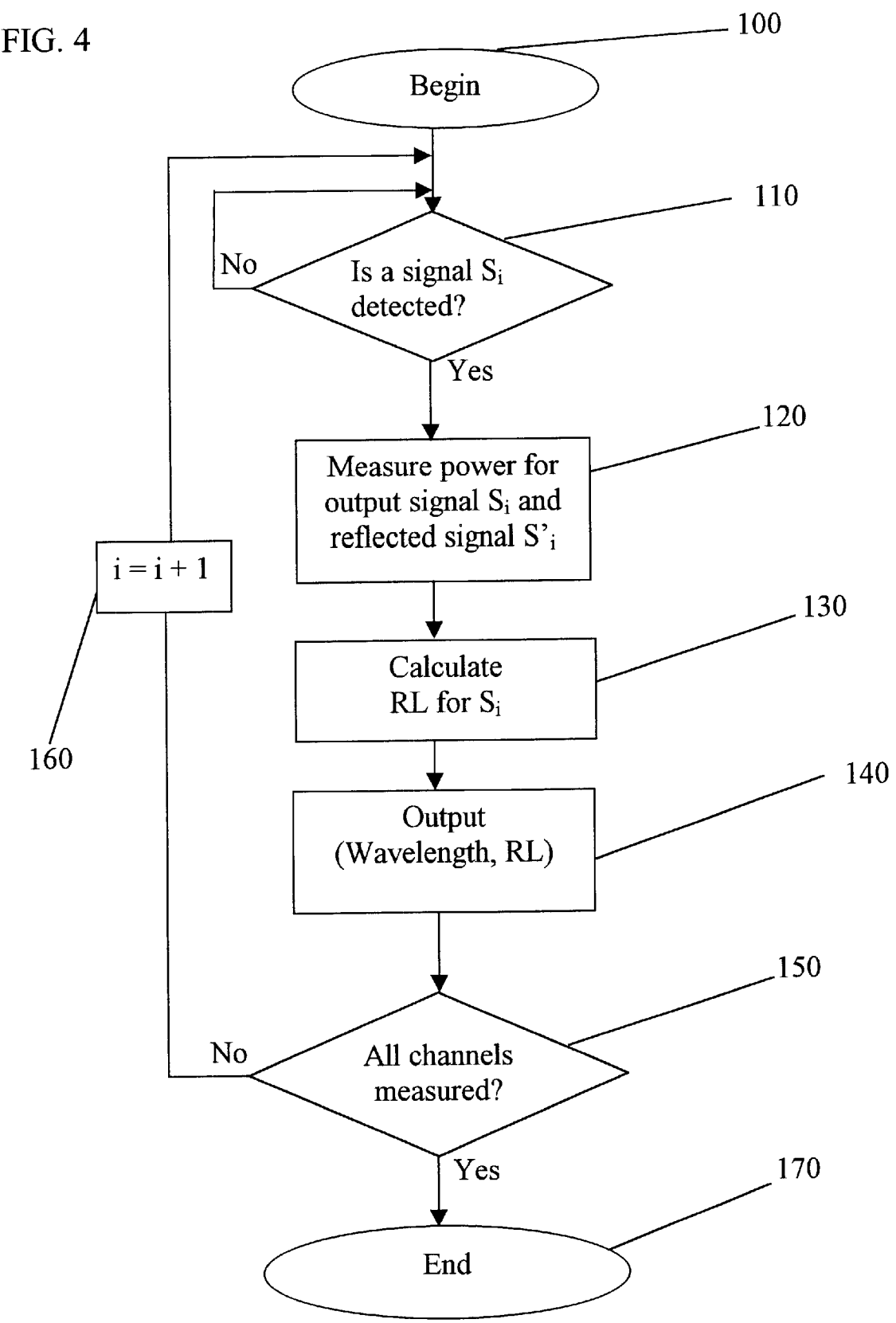
FIG. 4 is a flowchart illustrating the steps executed for the process of the invention.

FIG. 4 is a flowchart detailing the process flow in wavelength return loss detection. This process can be implemented using a detector that is either externally attached to or internally embedded in the optical circuit pack. The following process detects the return loss for a specific wavelength channel. Consequently, equipment failures, damages in an optical fibre, or reflective connections can be isolated. Referring to FIG. 4, the process begins at step 100. It should be noted that the process can be performed on a continual basis or periodically as needed. Step 110 is that of determining whether or not a signal Si is detected. If not, then the process is restarted until a signal is detected. If a signal is detected then step 120 is followed. According to step 120, the power of the output signal and reflected signal are measured. The power is measured at the output port and reflected port 35 of the optical circuit pack. Once measured, step 130 is used to calculate RL for the signal Si. The RL value can now be output, in step 140, to alert the optical transmission system of the amount of signal degradation. This detection process may be repeated or ended as determined by step 150. This step determines if all wavelength channels have been measured. If so, then the process ends at step 170. If not, then the process is continued and step 160 increments a counter. The process continues to detect the output signal and reflected signal at the output ports.

A person understanding the above-described invention may now conceive of alternative designs, using the principles described herein. All such designs which fall within the scope of the claims appended hereto are considered to be part of the present invention.

I claim:

1. A method for detecting return loss for an optical signal on a per wavelength basis at an output port of an optical circuit pack, comprising the steps of:
    a) detecting the optical signal at the output port of the optical circuit pack by means of a fused coupler and an optical tap connected to an optical switch;
    b) measuring power for the output signal and a reflected signal at the output port of the optical circuit pack by means of an optical means;
    c) calculating return loss per wavelength, as a ratio of the optical reflected power per wavelength to the output optical power per wavelength.

2. A method according to claim 1 further including the step of outputting the return loss as required by an optical transmission system.

3. A method according to claim 1 further including the step of repeating the method for a plurality of signals by means of the optical switch for detecting other wavelength channels.

4. An apparatus for determining optical return loss at output ports of an optical circuit pack in an optical transmission system on a per-wavelength basis, comprising:

optical means for detecting an outgoing optical signal of said optical circuit pack at each wavelength;

optical means for measuring the power of the outgoing optical signal and a reflected optical signal at each wavelength, optical spectrum analyzer for processing said detected outgoing optical signals and said reflected optical signals for determining the ratio of the reflected wavelength power to the output wavelength power, said ratio indicating the optical return loss;

wherein the means for detecting the outgoing optical signal comprises a fused coupler and an optical tap connected to an optical switch.

5. An apparatus according to claim 4, wherein said optical circuit pack is an optical amplifier module.

* * * * *